May 3, 1966     C. E. PLYMALE     3,248,755
ELASTIC MELT EXTRUDER
Filed Dec. 4, 1963
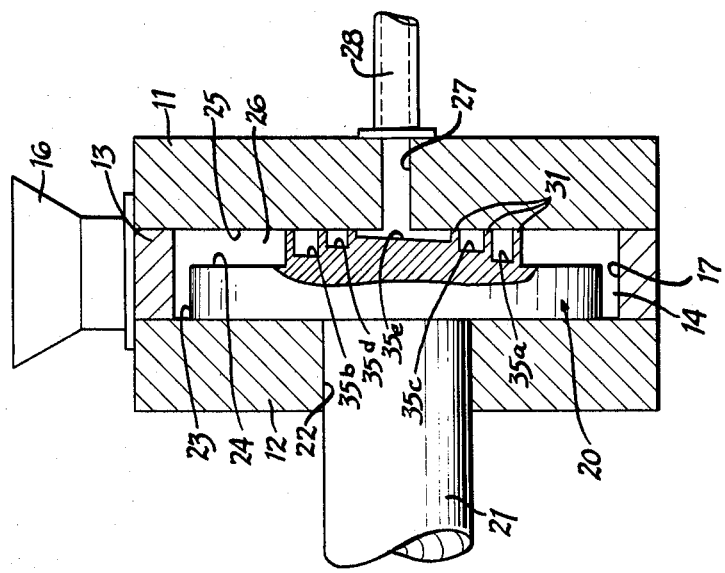
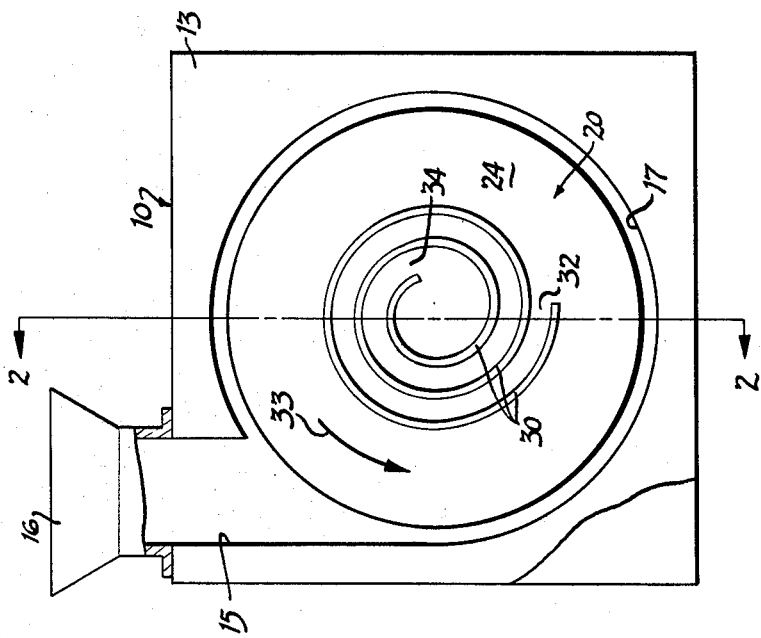
INVENTOR.
CHARLES E. PLYMALE
BY
ATTORNEYS "# United States Patent Office 3,248,755
Patented May 3, 1966

3,248,755
ELASTIC MELT EXTRUDER
Charles E. Plymale, Maumee, Ohio, assignor to Owens-Illinois Company, a corporation of Ohio
Filed Dec. 4, 1963, Ser. No. 327,930
3 Claims. (Cl. 18—12)

The present invention relates to an elastic melt or centripetal extruder. More specifically, the present invention relates to an apparatus for increasing the output pressure and the output volume of a centripetal extruder.

There has been recently developed a new type of plasticizer-extruder, commonly known as an "elastic melt extruder" utilizing "the normal force effect" or the "Weissenberg effect," i.e., the force developed when a viscoelastic material is sheared between a rotating plate and a stationary plate, to perform the functions of a conventional plasticizer-extruder. Such an elastic melt extruder is described in detail in "Modern Plastics Magazine" of October, 1959, at page 107, in an article by Bryce Maxwell an Anthony J. Scalora.

An elastic melt extruder of this type utilizes a power-driven, rotatable disc operable within a convolute chamber to which solid plastic material is furnished from a supply hopper or the like. A radial face of the disc is spaced through a narrow gap from the corresponding face of an orifice plate having an exit orifice axially aligned with the disc. As the disc is rotated, the thermoplastic material introduced peripherally of the disc and confined between the radial shearing faces of the disc and the orifice plate is subjected to shearing forces. The thermoplastic material is essentially elastic, and the tendency of the sheared material for elastic recovery after arcuate shearing and stretching between the radial faces effects centripetal flow of material between the disc and the orifice plate toward the central orifice, the material issuing from the orifice in plasticized condition at a predetermined pressure.

Although the elastic melt extruder, as above-described, is a very efficient means for plasticizing material, the relatively low pressure and low volume output of the machine requires the utilization of an accumulator or some other apparatus in conjunction with the extruder. Since the shearing rate of an elastic melt extruder is directly proportional to the velocity of the rotating plate relative to the stationary plate and inversely proportional to the distance between the plates, the maintenance of the same rate of shear at the center of the gap as at the exterior of the gap requires a decrease in the distance between the plates at the center of the gap. Previous attempts to decrease the gap or distance between the plates at the center has materially reduced the output of elastic melt extruders. Thus, in conventional designs, any attempt to increase the output pressure characteristics has resulted in less output from the unit.

The present invention proposes a new and novel elastic melt extruder and method of utilizing such an extruder wherein the normally utilized planar rotating disc or plate is provided with a central helical or spiral section effective to augment the centripetal force developed in the gap by an "auger-type" action to express more material at a greater pressure through the outlet orifice of the unit. Thus, the central portion of the rotating plate is formed as a helix of progressively decreasing cross-section capable of developing appreciable mechanical extrudate pressures as well as those centripetal forces normally developed in the extruder by the "Weissenberg effect."

It is therefore an important object of the present invention to provide a new elastic melt extruder capable of increased extrudate output at pressures greater than those normally developed.

Another important object of this invention is the provision of an elastic melt extruder wherein the pressure developed at a shearing gap is supplemented by mechanical pressures developed by forcing the plasticized material through a helical path of decreasing cross-sectional area toward and through an outlet orifice located centrally of the gap.

It is another, and no less important, object of the present invention to provide an improved apparatus for extruding thermoplastic material by subjecting the material to the Weissenberg effect developed at a shearing gap and supplementing the Weissenberg effect by subjecting the material to additional mechanical pressures.

Other objects of this invention will appear in the following description and appended claims, reference being had to the accompanying drawings forming a part of this specification wherein like reference characters designate corresponding parts in the several views.

On the drawings:

FIGURE 1 is a vertical sectional view, with parts shown in elevation, of an extruder of the present invention and;

FIGURE 2 is a sectional view, with parts shown in elevation, taken along the plane 2—2 of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawing:

In FIGURE 1, reference numeral 10 refers generally to an elastic melt extruder of the present invention, comprising spaced front and rear plates 11, 12 having interposed therebetween a central peripheral wall 13 enclosing a generally cylindrical inner chamber 14. Ingress to the chamber 14 is provided by a tangential inlet opening 15 in the central section 13 communicating at its upper end with an overhead hopper or the like 16, the inlet passage 15 merging smoothly into the inner wall 17 of the central wall or midsection 13.

Located interiorly of the chamber 17 is a rotary disc indicated generally at 20 having a drive shaft 21 driven by an electric motor or the like (not shown) and projecting through an opening 22 in the rear wall 12. Of course, the shaft 21 may be journalled in the opening 12 by appropriate anti-friction bearings or the like, so that the disc 20 may be rotated at a relatively high rotational speed.

The disc 20 is generally cylindrical in overall contour and has an exterior periphery 23 concentric with and radially spaced inwardly of the cylindrical wall 17 of the middle casing section 13. The forward face 24 of the disc 20 cooperates with the inner planar face 25 of the front wall 11 to define therebetween a shearing gap 26 of a size such that rotation of the disc 20 will subject material from the hopper 16 and entering the gap 26 to the Weissenberg effect, such material being advanced centripetally toward an outlet orifice or opening 27 located centrally of the fixed shearing face 25 for issuance through the extrudate outlet tube 28.

The radially inner portion of the rotative disc 20 is provided with a helically spiral wall 30 concentric with the outlet orifice 27 and of an axial extent sufficient that the extremities 31 of the wall contact, or are in extremely closely spaced running clearance with, the planar surface 25. The wall 30 with the faces of the plates 20 and 11 thus defines a confined spiral having an inlet opening 32 facing in the direction of rotation of the disc 20, the disc being rotated in the direction of directional arrow 33, and terminating in an outlet opening 34 closely adjacent the orifice 27.

Additionally, the cross-sectional area of the helical path defined by the wall 30 decreases uniformly toward the orifice 27 from a maximum cross-sectional area at the inlet opening 32 (determined by the size of the gap 26) to a minimum area immediately surrounding the orifice 27. This decrease in cross-sectional area is accomplished by decreasing the depth of the wall 30 from the inlet opening 32 to the outlet opening 34. Expressed another way, the depth of the spiral groove defined by the wall 30 is decreased by decreasing the distance of the bottom of the spiral groove (defined at the shearing face 24) from the shearing face 25 progressively toward the orifice 27 as indicated at 35a, 35b, 35c, 35d and 35e, respectively (FIGURE 2).

Thus, it will be seen that solid thermoplastic material entering the gap 26 between the rotating disc 20 and the fixed face 25 will first be plasticized at the gap 26 and, by virtue of the centripetal effect, will be advanced toward the orifice 27. The material, during its travel toward the orifice 27, will enter the spiral defined by the wall 30 at the opening 32 and will be subjected to increasing pressures as the cross-sectional area of the spiral path decreases progressively toward the orifice 27. In this manner, the material is subjected to increasingly greater pressures and is discharged through the orifice as it is subjected to the greatest of these pressures.

Of course, the cross-sectional area of the helical path defined by the wall 30 may be decreased in other ways, as by maintaining the gap constant at the value of the gap 26 and decreasing the radial distance between successive convolutions of the wall 30. In any event, the spiral or helical path constantly subjects the material to increasing mechanical pressures after the material has been initially subjected to the Weissenberg effect with the resultant generation of centripetal pressures.

The increased output pressure effectively exerted on the material to express the same through the orifice 27 will be readily appreciated and the increased utility of the apparatus and method for elastic melt or centripetal extrusion without the addition of extraneous apparatus will be readily appreciated.

While exemplary embodiments of the invention have been disclosed, it will be apparent to those skilled in the art that the disclosed embodiments may be modified. Therefore, the foregoing description is to be considered exemplary rather than limiting, and the true scope of the invention is that defined in the following claims.

I claim:

1. In an elastic melt extruder, a fixed shearing face and a rotatable shearing face defining therebetween a shearing gap communicating with a peripheral inlet opening and an axial outlet orifice, one of said faces being planar and the other of said faces having a planar outer portion cooperating with said one face to receive plastic material from said inlet opening therebetween and having a helical wall concentric about said outlet orifice and projecting axially from said planar outer portion toward said other face, said wall circumscribing a peripherally enclosed helical path into which material from the planar outer portion is channelled to be progressively advanced toward said orifice, the cross sectional area of said path progressively decreasing as the material advances through said path and toward said orifice.

2. In an elastic melt extruder, a fixed shearing face and a rotatable shearing face defining therebetween a shearing gap communicating with a peripheral inlet opening and an axial outlet orifice, said rotatable shearing face having a planar outer portion cooperating with said fixed face to receive plastic material from said inlet opening therebetween and having a helical wall concentric about said outlet orifice and projecting axially from the plane of said outer portion into close running relationship to said fixed face, said wall circumscribing a spiral ramp along which material from the planar outer portion is progressively advanced centripetally toward said orifice, the spacing of said ramp from said fixed face progressively decreasing toward said orifice, thereby defining a gap of decreasing dimension as the material advances toward said orifice.

3. In an elastic melt extruder having a fixed shearing face and a rotatable shearing face defining therebetween a shearing gap communicating with a peripheral inlet opening and an axial outlet orifice, the improvement wherein one of said shearing faces is planar and the other of said faces has a planar outer portion cooperating with said one face to receive plastic material from said inlet opening therebetween, said other face having a radially inner nonplanar portion thereof defining a helical path concentric about said outlet orifice and of increasing axial extent as it approaches said orifice, and a unitary continuous wall means circumscribing said helical path and in close running relationship to said one face to confine and progressively advance plasticized material through a progressively decreasing shearing gap from said planar portion toward said orifice.

References Cited by the Examiner

UNITED STATES PATENTS

| | | | |
|---|---|---|---|
| 3,032,814 | 5/1962 | Miner | 18—12 |
| 3,068,517 | 12/1962 | Blackmore | 18—12 X |
| 3,079,635 | 3/1963 | Adams | 18—12 X |
| 3,137,034 | 6/1964 | Adams | 18—12 X |

FOREIGN PATENTS 1,262,650  4/1961  France.

WILLIAM J. STEPHENSON, *Primary Examiner.*

J. SPENCER OVERHOLSER, *Examiner.*

L. S. SQUIRES, *Assistant Examiner.*